June 27, 1933.  W. A. VAN BERKEL  1,915,340
WORK CLAMP
Filed Sept. 18, 1930  2 Sheets-Sheet 1

Inventor:
Wilhelmus A. van Berkel
Chas. M. Nissen,
By Atty.

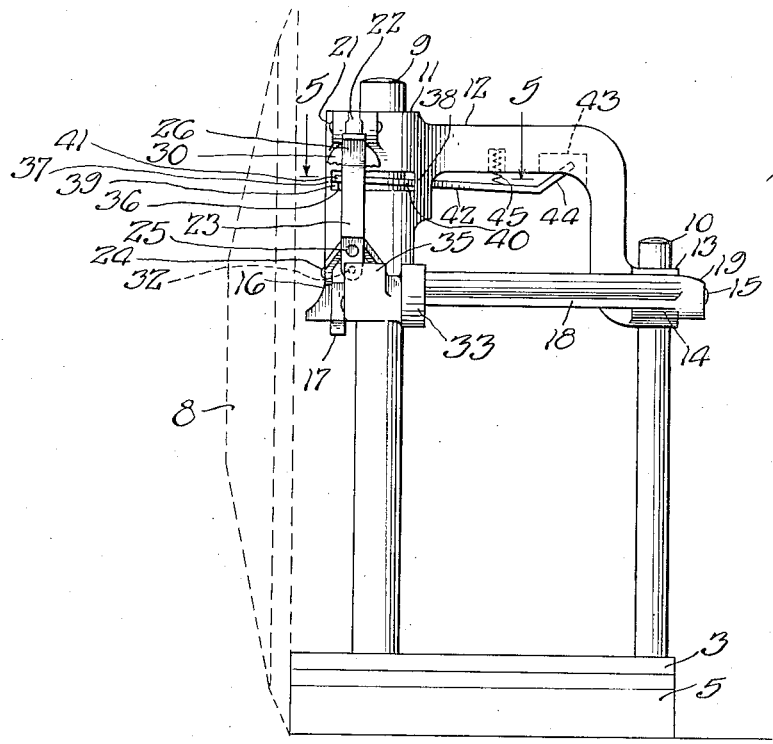
Fig. 3
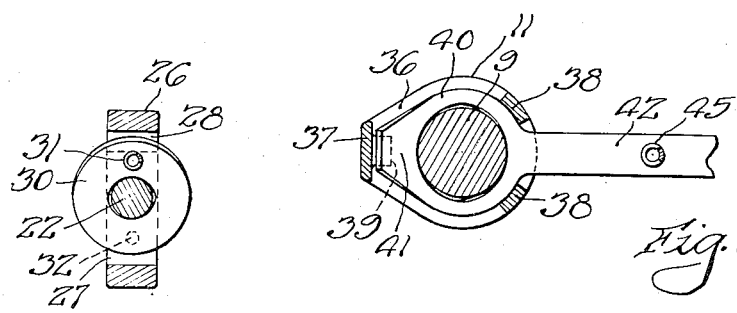
Fig. 4
Fig. 5
Inventor:
Wilhelmus A. van Berkel,
By Chas. M. Nissen,
Atty.

Patented June 27, 1933

1,915,340

UNITED STATES PATENT OFFICE

WILHELMUS A. VAN BERKEL, OF MONTREUX, SWITZERLAND, ASSIGNOR TO U. S. SLICING MACHINE COMPANY, OF LA PORTE, INDIANA, A CORPORATION OF INDIANA

WORK CLAMP

Application filed September 18, 1930, Serial No. 482,679, and in Great Britain November 27, 1929.

This invention relates to slicing machines and particularly to clamping devices for slicing machines of the type in which a clamp, for instance a serrated bar, is supported only at one side of the work table of the slicing machine by one or more uprights (usually two) so as to leave the other side of the work table unobstructed. An example of a clamp belonging to this type is described in the application of Hendrik Stukart, Serial No. 183,386 filed April 13, 1927.

One object of the present invention is to provide a clamp of the above type with improved means for allowing it to be adjusted to any desired inclination to facilitate clamping of the substance to be sliced and for holding the same in that position.

More specifically the clamp which I intend to use is pivoted to a supporting member and has a connection between a part at or near its free end and the supporting member, the said connection being provided with means for adjusting the pivotal clamp at the desired inclination.

Another object of this invention is to provide a connection between the support for the clamping bar and the clamping bar which can vary freely in length during angular adjustment of the clamp but is normally constrained against such variation, for example, when the clamp is not in use or is in clamping position. This connection thereby retains the clamp at any inclination to which the same has been adjusted.

A more specific object of this invention is to provide a support for a clamping bar which is vertically adjustable on an upright and has the clamping bar pivotally mounted thereon. Means is provided for locking the support in position on the upright and telescoping members connect the free end of the clamping bar with the support to permit one to vary the angular position of the clamping bar relative to the support. Means is provided for locking the telescoping members in adjusted position to thereby maintain the clamp in desired position.

A still further object of this invention resides in providing means which will release the telescoping members and permit the clamping bar to be angularly adjusted. This means comprises an operating handle adjacent the free end of the clamping bar and this handle is provided with means which will release the telescoping members when desired. The handle not only acts as a means for releasing the telescoping members from locking engagement with each other, but also serves as a means for moving the clamping bar into or out of operative position.

One form of the invention is illustrated in the accompanying drawings in which Fig. 1 is an elevational view of the entire clamping device as viewed from a direction perpendicular to the cutting plane of the knife;

Fig. 3 is an elevational view looking from the operator's side of the table;

Fig. 4 is a section on the line 4—4 of Fig. 1; and

Fig. 5 is a section on the line 5—5 of Fig. 3.

Figure 2:
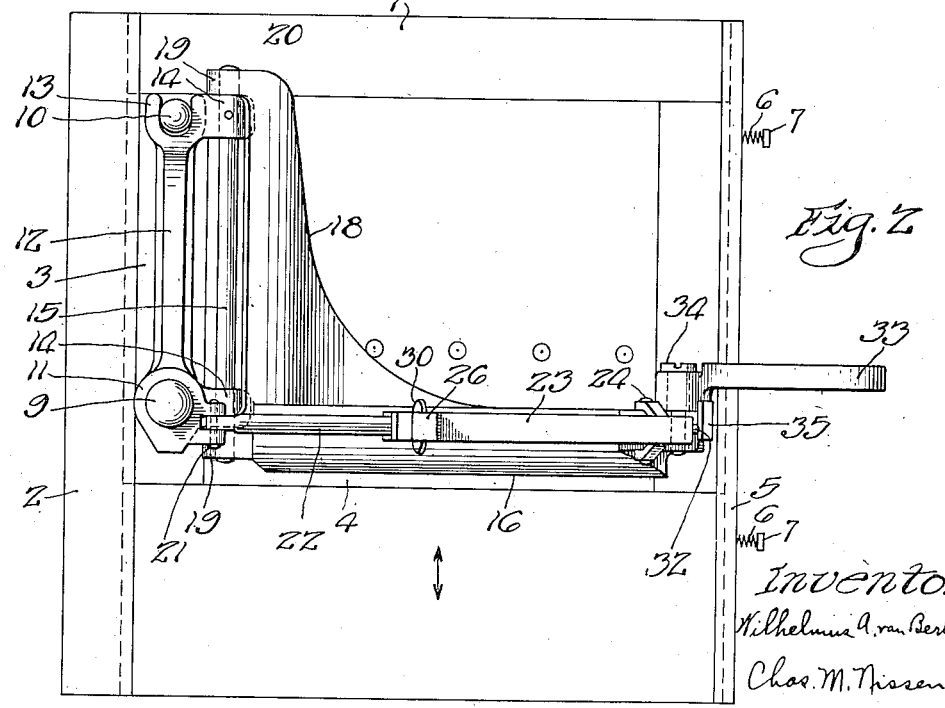
Fig. 2 is a plan view of the device shown in Fig. 1.

The work table is designated generally by the reference numeral 1 and has an upstanding flange 2 with an overhanging part 3 which is adapted to engage the upper surface of the feed plate 4. A spring pressed plate 5 yieldingly held against the edge of the feed plate 4 by the spring 6 surrounding the pin 7 is adapted to yieldingly urge the feed plate against the upstanding flange 2. The feed plate is adapted to reciprocate longitudinally of the table 1 as indicated by the double headed arrow in Fig. 2 so as to feed the substance towards and from the cutting plane of the knife. Preferably the feed plate is fed forwardly towards the cutting plane of the knife 8 by means of a mechanical feeding mechanism (not shown but of any well known construction). This part of the mechanism shown in the drawings does not constitute any part of my invention but is merely included for the sake of clearness and to show the manner in which the clamp is adapted to be used. It will be understood, of course, that my clamp may be used with a substance support which is not necessarily in the form of a feed plate but in most instances the clamp will be associated with a feed plate or equivalent structure.

My invention is concerned chiefly with the clamping of the substance on the feed table. In machines of this nature the operator usually stands at the right of the machine as viewed in Figs. 1 and 2, or directly in front of the machine as viewed in Fig. 3. In view of the fact that it is desired to have the operator's side of the machine clear of as much obstruction as possible, I mount the clamp on two uprights 9 and 10 on the side of the feed plate away from the operator.

A bracket comprising the bearing portion 11, handle portion 12 and forked extension 13 is slidably mounted on the uprights 9 and 10. The bearing portion 11 has an opening extending therethrough of substantially the same diameter as the upright 9 so that the same will slide thereon without any substantial amount of rocking movement, it being understood of course, that there is sufficient clearance between the upright and the bearing portion to permit free vertical movement of the support. The forked extension 13 has the prongs of the fork extending on opposite sides of the upright 10 to prevent the bearing portion 11 from rotating about the upright 9.

The supporting member also carries the lugs 14 through which a rod 15 extends, this rod acting as a pivot for the clamping member. Pivoted to the rod 15 adjacent the bearing portion 11 is a clamping bar 16 provided with the teeth 17 on the lower side thereof. A web 18 extends outwardly from the clamping bar in a direction substantially towards the side of the work holder away from the slicing knife and has a lug 19 on the end thereof through which the rod 15 extends. Any suitable means such as the pin 20 may be used to hold the rod in operative position and prevent longitudinal movement thereof.

The bearing portion 11 also has the rod 22 pivoted thereto at 21, and this rod telescopes within the casting 23 pivoted at 24 to the outer end of the clamping bar 16. The rod 22 slides within a suitable bore 25 in the casting 23. The casting 23 has an enlarged head 26 with an opening 27 therein. Within this opening are arranged the abutments 28 and 29. A clutch ring 30 surrounds the rod 22 and has one edge thereof spring-pressed against the abutment 28 by means of the spring 31. An operating rod 32 is slidably mounted within a suitable bearing in the enlarged head 26 and has one end thereof adapted to engage the clutch ring 30 at the edge thereof opposite to that edge engaged by the spring 31. The other end of the operating rod 32 is slidably mounted in the end of the casting 23 which is pivoted to the clamping bar.

A handle 33 is pivoted at 34 to the clamping bar 16 and carries an integral abutment 35. This abutment lies adjacent the end of the operating rod 32 so that when the handle 33 is moved in a counter-clockwise direction as viewed in Fig. 1, the rod 32 will be moved to the left in that figure and cause the ring 30 to move towards the abutment 29. It will be noted that the spring 31 is located in such a position that while it urges the ring against the abutment 28, it also causes the ring to tilt at an angle to the rod 22, the abutment 28 acting as a pivot for this purpose.

The tilting of the ring 30 causes the ring to grip the rod 22 with sufficient force that ordinarliy the rod 22 and casting 23 will be held in adjusted relation with each other as long as the operating rod 32 remains inoperative. If an upward force is exerted on the clamping bar 16, this force will tend to telescope the rod 22 within the casting 23 but such movement will be prevented by the clutch ring 30 which will increase its gripping action as the rod 22 tends to move into the casting 23.

On the other hand, if it is desired to move the bar 16 downwardly or rather in a clockwise direction about its pivot 15, then the clutch ring 30 does not offer sufficient resistance to prevent such a movement although there is sufficient gripping effect by the ring 30 to normally hold the clamping bar in any desired adjusted position against the force of gravity.

Figure 1:
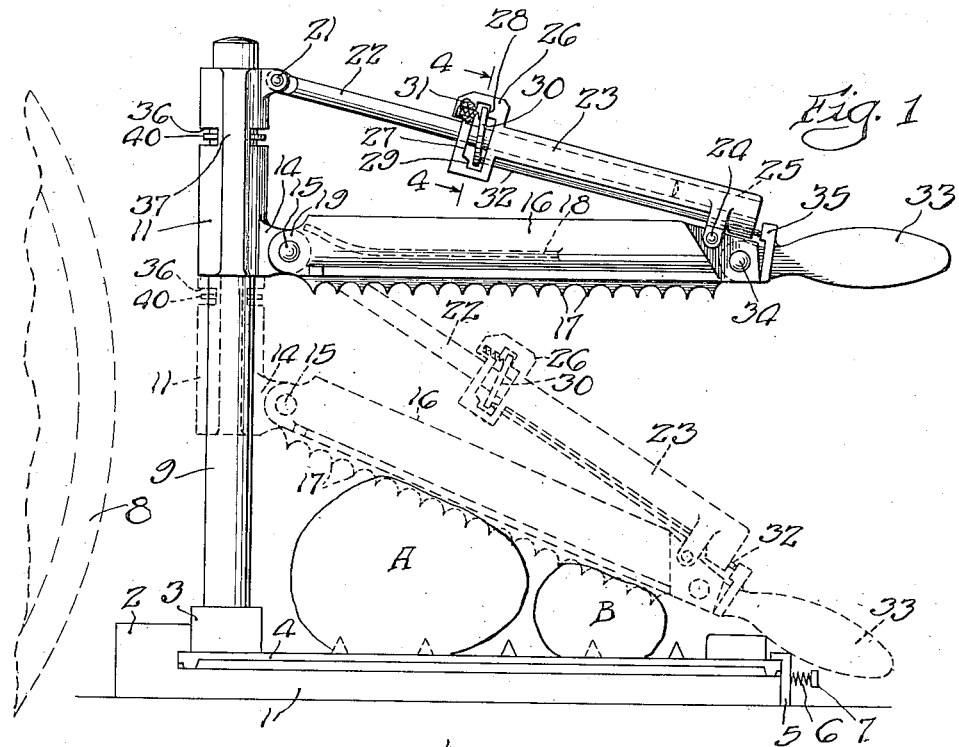

In order to permit angular adjustment in a counter-clockwise direction in Fig. 1, it is necessary to grasp the the handle 33 and move the same vertically thereby causing the projection 35 to move the operating rod 32 to the left to cause the ring 30 to move to a position such that its axis is substantially parallel with the rod 22. In this position obviously the ring 30 does not exert a clamping effect and the clamping bar may be moved either counter-clockwise or clockwise as desired. As long as the handle 33 is held in such a position it releases the clutch ring 30. When the handle 33 is moved downwardly the clutch ring 30 again takes effect but is not sufficient to resist the action of the operator's hand when moving the handle downwardly to change the angular position of the clamping bar 16. As soon as the operator stops exerting a downward pressure on the handle 33, the clutch ring 30 will take effect and prevent any further movement of the clamping bar under the force of gravity. Also as previously explained upward movement of the clamping bar is prevented.

By the arrangement just described the angular position of the bar may be determined and the same retained in that position by the clutch ring 30. One purpose for having the clamping bar angularly adjustable in to hold a plurality of substances of different thicknesses such as illustrated in Fig. 1 with the substances A and B. Or the clamping bar may have its angular position utilized for the purpose of exerting a clamping force which acts partially in a direction opposite to the force exerted by the knife on the substance as a slice is being cut. Once the angular position of the clamping bar is determined for any particular substance or combination of substances, the same may be permitted to remain in that position and the clamp may then be moved bodily in a vertical direction by sliding the support vertically along the uprights 9 and 10.

It is also necessary to provide means for preventing movement of the support in a vertical direction as otherwise the clamp would be ineffective. Of course, I may form the support integral with the uprights or fasten the same rigid thereto and merely use the angular adjustment of the clamping bar. I prefer, however, to use both the angular adjustment of the clamping bar and the bodily movement thereof.

The bearing portion 11 is provided with a cutaway portion 36. The upper and lower portions of the bearing portion 11 on opposite sides of the cutaway portion 36 are held rigidly together by means of the connecting webs 37 and 38. An abutment 39 is provided within the cutaway portion and a clutch loop 40 surrounding the upright 9 has an extension 41 thereon adapted to normally rest on the projection 39. The other side of the clutch loop is provided with a finger extension 42 which passes between the webs 38 into a position just below the handle portion 12. The handle portion 12 is provided with a recess 43 which receives the belt end 44 of the finger extension 42. The spring 45 normally tends to tilt the clutch loop in a clockwise direction as viewed in Fig. 3 and this tends to normally hold the support against downward movement under the force of gravity. However, when a pressure is exerted in a downward direction on the handle 12, the support and clamp are moved bodily in that direction to clamp the substance. When it is desired to raise the clamp it is necessary to move the finger extension 42 against the action of the spring 45 in order to release the clutch loop 40 from its gripping engagement with the upright 9 as otherwise the clutch loop will only tend to increase its gripping effect and prevent any upward movement of the support or clamping bar. It will readily be seen that I have provided two very novel adjustments for the clamping bar. One is a vertical adjustment and the other is an angular adjustment. Either adjustment may be used by itself or both adjustments may be used together to effect the clamping of the substance or substances. It will be obvious that the movements of the clamp about its pivot may be of considerable magnitude in view of the length of the rod 12 and the amount of permitted movement of the rod within the bore 25.

It will also be noted that the relatively long telescoping members 22 and 23 permit the clamping bar to be moved to a position above the full line position shown in Figure 1 into a substantially vertical position, thereby positioning the clamp away from the operator's position and enabling the operator to place the substance on the substance support with greater facility than if the clamp could be only moved to the full line position shown in Figure 1. The relatively long telescoping members, which are mutually carried by each other, also provide a very rigid connection between the clamp bar and the bearing 11.

It is to be understood that modifications may be made in my invention without departing from the scope thereof. For example, other means than clutch rings may be employed to hold the clamp in adjusted position or to hold the support for the clamp in position along the uprights 9 and 10.

Other modifications will occur to those skilled in the art to which this invention pertains.

Having thus fully described an embodiment of my invention, what I desire to secure by Letters Patent of the United States is:—

1. In a clamp for slicing machines and the like, the combination with an upright, a bearing member movable along said upright, a clamping bar extending over the substance supporting surface of said slicing machines and pivoted to said bearing member, telescoping members mutually guided by each other and pivoted respectively to said bearing member and to said clamping bar, the telescoping member pivoted to said bar being pivoted at a point remote from the pivotal connection between said bearing member and said bar, means for holding said telescopic members in longitudinal adjustment with respect to each other, to thereby adjust the angular position of said clamping bar and means entirely independent of the means for holding said telescoping members in adjusted position for holding said bearing member in adjusted position along said upright.

2. In a substance support and clamping means for slicing machines, the combination with a substance support, a guide extending away from said support, a bearing member guidable along said guide, a clamping bar carried by said bearing member and angularly adjustable relatively thereto for varying the angular position of the clamping surface of the clamping bar with respect to said substance support, telescoping members connected respectively to said clamping bar and to said bearing member at points spaced a substantial distance from each other, said telescoping members being mutually guided by each other, a friction device for holding said telescoping members in position to hold said bar against movement in a direction away from the substance being sliced, a rod for releasing said friction means, a handle pivoted to said bar and automatically operable to move said bar to release said friction means as the handle is gripped and moved vertically to thereby release said telescoping members and to permit the movement of said clamping bar away from the substance being clamped.

3. In a substance clamp for slicing machines, the combination with an upright, a bearing member slidable along said upright, a clamping bar pivoted to said bearing member and a relatively long telescoping extensible member connected respectively to said bearing member and clamping bar at points spaced from the pivot of said clamping bar, the pivotal connection with said bar being at a point remote from the pivotal connection between said bar and said bearing member, means for holding said extensible member in extended position to thereby prevent movement of the clamping bar away from the substance being clamped thereby, said clamping bar being movable about its pivot through a wide range of angular positions on both sides of a plane perpendicular to the direction of movement of said bearing member along said upright so that said clamping bar may be moved upwardly and away from the operators position to give the operator easier access to the space beneath the normal position of the clamping bar and to permit the clamping bar to be held in different adjusted angular positions with respect to the substance being clamped independently of the movement of the bearing member along said upright.

4. In a substance clamping means in a slicing machine, the combination with a support, an upright on said support, a bearing slidable along said upright, a clamping member pivotally connected to said bearing member and telescoping members slidably guided by each other and pivotally connected to said clamping bar and bearing member at points spaced a substantial distance from each other, a friction device for holding said telescoping members in adjusted position with each other and positively preventing movement of the clamping bar in a direction away from the substance support and means for releasing said friction device to permit movement of the clamping bar away from said substance support, said friction device being operable to hold said clamping bar against movement toward the substance support under its own weight and the weight of the parts bearing thereon but permitting manual movement of said clamping bar toward said substance support if and when desired.

5. A clamping device for slicing machines comprising a substance support, an upright mounted on said support, a bearing member slidable along said upright, a clamping bar pivoted to said bearing member near said upright, means for holding said bearing member in its position along said upright, a relatively long rod pivoted to said bearing member, a member having a bore therein pivoted to said clamping bar at the free end thereof and provided with a longitudinal opening for receiving and guiding said pivoted rod, said member having an enlarged opening therein communicating with said longitudinal opening, a ring arranged within said enlarged opening and surrounding said rod, means for normally holding said ring in a position to grip said rod and prevent movement thereof relatively to said member, and means for releasing said ring, said relatively long rod which is pivoted to said bearing member permitting said clamping bar to be moved through a wide range of angular adjustments about its pivot.

In testimony whereof I have signed my name to this specification on this 18th day of August, A. D. 1930.

WILHELMUS A. van BERKEL.